United States Patent [19]

Wildmoser

[11] 4,406,607

[45] Sep. 27, 1983

[54] TUBE SHAPING DEVICE

[75] Inventor: Martin M. Wildmoser, Staten Island, N.Y.

[73] Assignee: John Mueller, Northvale, N.J. ; a part interest

[21] Appl. No.: 363,051

[22] Filed: Mar. 29, 1982

[51] Int. Cl.³ ............................................. B29D 23/00
[52] U.S. Cl. .................................. 425/392; 425/393; 425/403; 264/296
[58] Field of Search ...................... 425/392, 393, 403; 264/296, DIG. 41

[56] References Cited

U.S. PATENT DOCUMENTS 3,303,249  2/1967  Strauss ........................... 425/392 X
3,562,372  2/1971  Schjeldahl ..................... 425/392 X
4,297,306  10/1981  Yoshino ......................... 425/392 X Primary Examiner—Thomas P. Pavelko
Attorney, Agent, or Firm—Lerner, David, Littenberg, Krumholz & Mentlik

[57] ABSTRACT

A tube shaping device is described for shaping the deformed end of a flexible tube, for example, toothpaste tubes, medicine tubes, paint tubes and the like. Such shaping device is constructed from a cylindrical body having an opening at one end thereof and a conical shaping member arranged within the opening extending outwardly therefrom. The conical shaping member is adapted to increasingly be received within the open end of the tube until the shape of such tube end is conformed to the circumferential shape of the base of the shaping member.

7 Claims, 5 Drawing Figures

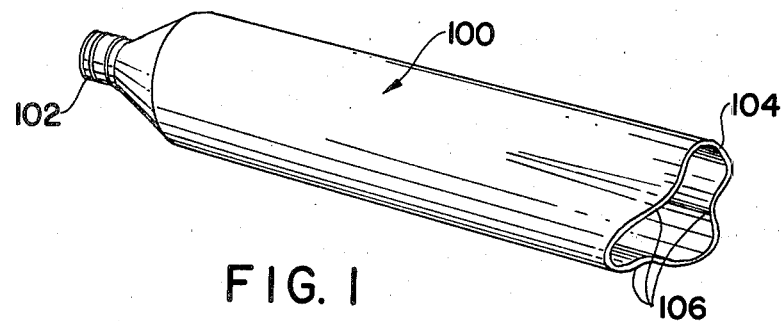
FIG. 1
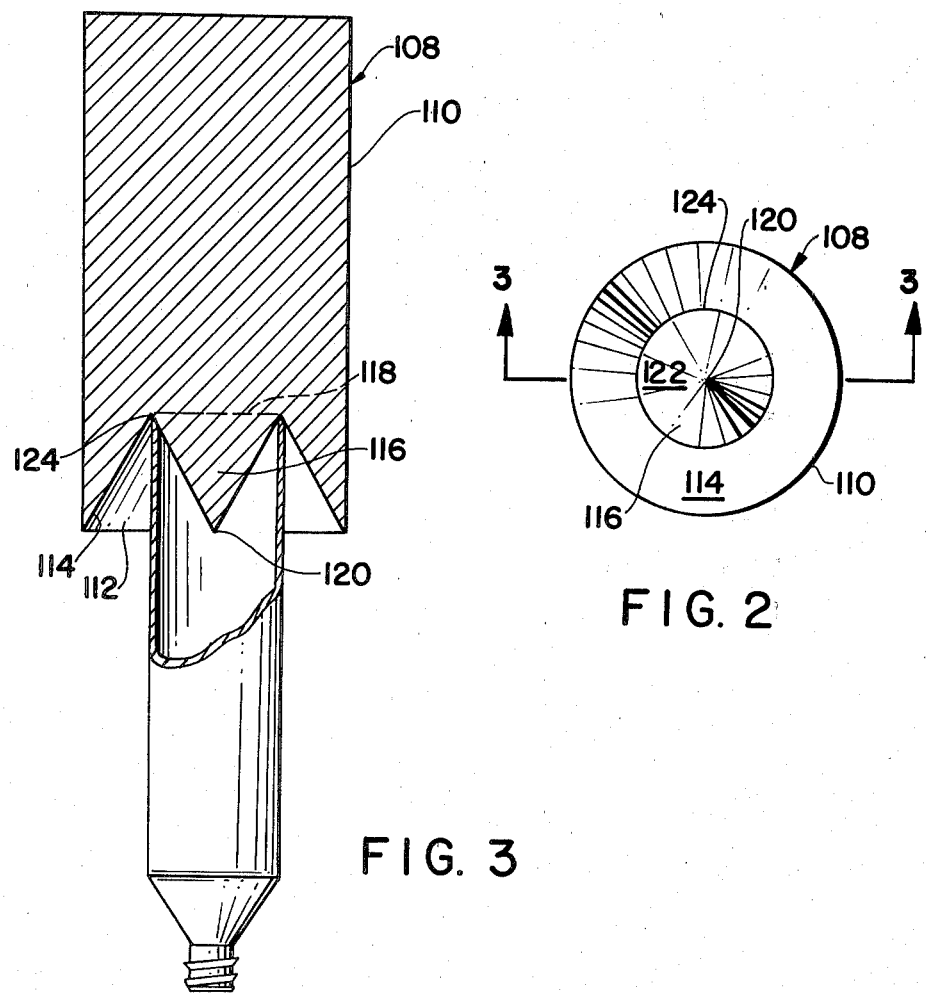
FIG. 2
FIG. 3

TUBE SHAPING DEVICE

BACKGROUND OF THE INVENTION

The present invention relates in general to a tube shaping device and, more particularly, to a shaping device adapted to shape the deformed end of a flexible tube, for example, toothpaste tubes, medicine tubes, paint tubes and the like.

In the tube filling industry, there frequently arises the problem of supplying flexible tubes to an automatic filling and sealing machine without their being deformed as a result of their construction from relatively soft materials, i.e., soft metal, plastic, laminated material, etc. The reliability of such machines, including the economics of their operation, is to a large extent determined by the continuous receiving of such flexible tubes having a nondeformed open end of generally circular or rounded shape. If the open end of such tubes are found to be closed, damaged or otherwise deformed at the filling station of the machine, such tubes often cannot be successfully filled. In this regard, such deformed tubes must be removed to prevent the machine from potentially getting jammed which would ultimately result in laborious and time-consuming machine repair along with its associated cost. In addition, the inability to supply such flexible tubes having their open end suitably shaped for the filling operation often results in such machines remaining idle and unproductive while such deformed tubes are being removed from the machine.

There is known one prior art device adapted to shape the ends of flexible tubes that have lost their roundness by being deformed during the supplying of such tubes to and within an automatic filling and sealing machine. Such prior art shaping device is constructed from a cylindrical member having an inwardly tapered opening provided at one end of the device. The tapered opening is sized sufficiently greater than the normal outside diameter of the tube so as to receive the tube end to be shaped. In use of the shaping device in accordance with the prior art, a flexible tube having its end out of round is centrally positioned within the tapered opening and urged upwardly therein. As the out of round tube end engages the surfaces forming the tapered opening, such surfaces are operative to cause the tube end to increasingly assume a rounded shape. The tube end within the tapered opening of the shaping device has thus been rounded to a shape suitable for the subsequent filling operation.

However, such prior art shaping device is not adaptable for shaping the end of flexible tubes which exhibit a variety of frequently occurring deformations. For example, such tube ends in addition to being out of round, are often found to have their ends partially collapsed or dented. In this regard, although the prior art device can provide roundness to an otherwise out of round tube end, such prior art device is not effective for eliminating inward deformations such as dents, depressions, flattened portions and the like.

Accordingly, it can be appreciated that there is an unsolved need for a shaping device which is adapted to shape flexible tube ends which exhibit a variety of deformations of the type noted above, in addition, to being out of round.

SUMMARY OF THE INVENTION

It is broadly an object of the present invention to provide a shaping device adapted for shaping the open end of a flexible tube which overcomes or avoids one or more of the foregoing disadvantages resulting from the use of the above-mentioned prior art shaping device and, which fulfills the requirements of such a shaping device for use while supplying flexible tubes to an automatic filling and sealing machine. Specifically, it is within the contemplation of one aspect of the present invention to provide such a shaping device adapted for use with flexible tubes of soft metal, plastic or laminated material for shaping the open end thereof which has become damaged by exhibiting deformations such as lack of roundness, dents, depressions, flattened portions and the like.

A further object of the present invention is to provide a tube shaping device which is adjustable for shaping the ends of tubes of varying diameter.

In accordance with one embodiment of the present invention there is provided a tube shaping device constructed from a body having an opening at one end thereof and a shaping member arranged within the opening extending outwardly. The shaping member is provided with a base arranged such that the circumferential edge of the base is bound by a portion of the body forming the opening, whereby the shaping member is adapted to be received within a tube end until the tube end lies substantially within a plane containing the base of the shaping member such that the shape of the tube end is conformed to the circumferential shape of the base.

In accordance with the above embodiment, the body is provided with a bore extending therethrough in communication with the opening and wherein the shaping member is adapted for sliding fit within the bore between a plurality of positions whereby the effective diameter of the base varies.

Further in accordance with the above embodiment, the shaping member further includes a cylindrical portion having a plurality of longitudinally extending circumferentially positioned teeth adapted to be received within corresponding longitudinally extending openings provided within the surface portion of the body forming the bore.

BRIEF DESCRIPTION OF THE DRAWINGS

The above description, as well as further objects, features and advantages of the present invention, will be more fully understood by reference to the following detailed description of a presently preferred but nonetheless illustrative tube shaping device in accordance with the present invention when taken in conjunction with the accompanying drawings, wherein:

FIG. 1 is a perspective view of a flexible tube formed of soft metal, plastic or laminated material and having its open end damaged by being out of round and having various deformations;

FIG. 2 is a bottom elevational view of the tube shaping device showing the tapered opening provided in the body thereof and the shaping member centrally located therein;

FIG. 3 is a cross-sectional view taken along line 3—3 of FIG. 2 showing such shaping device in operation to shape the open end of a flexible tube having a section thereof removed for clarification;

DETAILED DESCRIPTION

Figure 4:
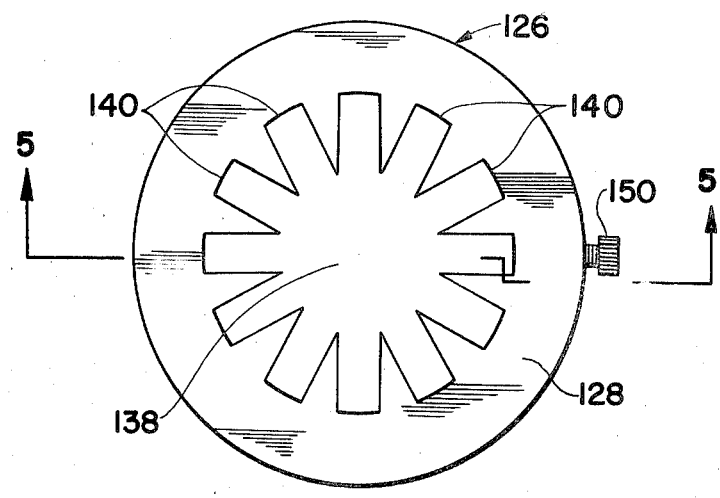
FIG. 4 is a top elevational view of an adjustable tube shaping device in accordance with the present invention; and, FIG. 5 is a cross-sectional view taken along line 5—5 of FIG. 4 showing the adjustable shaping member having a cylindrical portion provided with rectangular teeth and adapted for sliding fit within a bore provided within the surrounding body between a plurality of positions such that the effective diameter of the base of the shaping member varies.

Referring generally to the drawings, the tube shaping device of the present invention will now be described in a greater detail. The overall construction of the shaping device in accordance with one embodiment of the present invention will be described with reference to FIGS. 2 and 3 generally; and, a further detailed description of an additional embodiment of an adjustable shaping device in accordance with the present invention will be described with reference to FIGS. 4 and 5 generally. Referring specifically to the drawings in which like reference characters represent like elements, there is shown in FIG. 1 a flexible tube 100 generally constructed from soft metal, plastic or laminated material, such tubes being generally suitable for use as toothpaste tubes, medicine tubes, paint tubes and the like. As described, a plurality of such tubes are to be supplied to an automatic filling and sealing machine. The tube 100 is provided with a closed end 102 and an open end 104 through which the contents of such tube are provided during the filling operation. As illustrated, the open end 104 is substantially out of round and has a plurality of deformations 106, e.g., depressions or dents. As to be described in operation of the tube shaping device of the present invention, such device is adapted to shape the open end 104 into a generally circular cross-section of equal diameter to that of the remainder of the tube 100 and to effectively eliminate the deformations 106.

Specifically referring to FIGS. 2 and 3, there is shown a tube shaping device constructed in accordance with one embodiment of the present invention and generally designated by reference character 108. The shaping device 108 is constructed from a cylindrical body 110 which can be constructed from Teflon, plastic, or suitable metal material such as aluminum or stainless steel. Provided at one end of the cylindrical body 110 is a tapered opening 112 formed by an inwardly tapering circumferential surface 114. A shaping member 116 is centrally arranged within the opening 112 and extends outwardly therefrom. As illustrated, the shaping member 116 is in the form of a cone having a base generally indicated by the dotted line 118 in FIG. 3, an apex 120 and an exterior surface 122. The base 118 of the shaping member 116 is arranged such that its circumferential edge 124 is generally bound by a portion of the surface 114 forming the opening 112. The base 118 defined by its circumferential edge 124 is generally of circular cross-section, as shown in FIG. 2. As will be understood from a further description of the shaping device 108 in accordance with the present invention, the shaping member 116 may be provided whereby the base 118 as defined by its circumferential edge 124 is other than circular in shape, e.g., elliptical or oval and the like.

The shaping member 116 as arranged in FIG. 3 has its apex 120 lying substantially in a plane containing the open end of the cylindrical body 110. However, it is contemplated that the opening 112 can be provided of lesser or greater extent whereby the apex 120 of the shaping member 116 will be located remote from the open end of the cylindrical body 110. For example, the base 118 of the shaping member 116 can be arranged to lie substantially in the plane containing the open end of the cylindrical body 110 such that the shaping member projects away from the longitudinal extent of the cylindrical body 110, or the extent of the shaping member may be provided entirely within the opening 112.

The operation of the shaping device 108 will now be described with reference to FIG. 3. The shaping device 108 may be incorporated as a hand held tool to individually shape a tube end or one or more of such shaping devices may be incorporated within an automatic filling and sealing machine to shape such tubes automatically during the operation of the machine. In either event, a flexible tubes of the type described with respect to FIG. 1 is provided with its open end 104 underlying the open end of the shaping device 108. Upon bringing the open end 104 of the tube 100 into the opening 112 for alignment with the shaping member 116, the apex 120 of the shaping member is inserted within the open end of the tube. The alignment of the shaping member 116 with the open end 104 of the tube 100 is assisted by the inwardly tapering surface 114 forming the opening 112 at the end of the shaping device 108. As the shaping device 108 is moved downward or the tube 100 moved upward, the shaping member 116 is increasingly received within the open end 104 of the tube until the open end of the tube lies substantially within a plane containing the base 118 of the shaping member as bound by the circumferential edge 124. In this regard, the shaping member 116 is adapted to shape the open end 104 of the tube 100 to conform it to the shape and size of the base 118 defined by its circumferential edge 124, in addition, to effectively eliminating the deformations 106.

Generally, in accordance with the preferred embodiment of the present invention, the base 118 of the shaping member 116 has a diameter substantially equal to that of the normal diameter of the tube 100. In this regard, as the base 118 is bound by the surface 114 forming the opening 112 within the cylindrical body 110, such construction prevents the flairing outwardly of the open end 104 of the tube 100 beyond its normal diameter.

Figure 5:
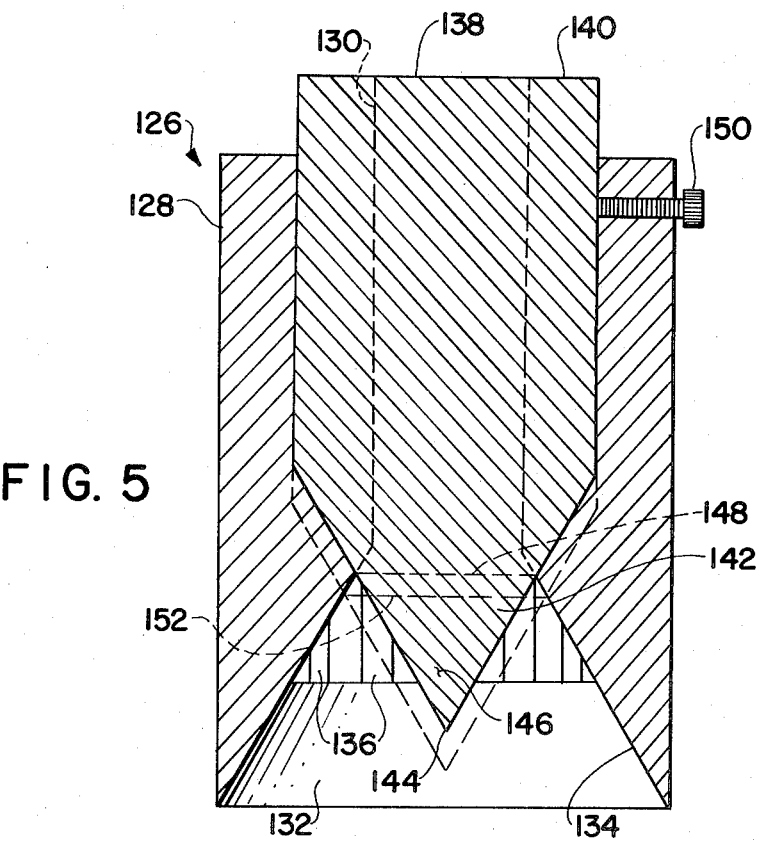

Referring to FIGS. 4 and 5, there will now be described an adjustable shaping device 126 in accordance with another embodiment of the present invention. The adjustable shaping device 126 is constructed from a cylindrical body 128 having a longitudinally extending bore 130 communicating with an opening 132 provided within one end of the cylindrical body. The opening 132 is constructed generally similar to the opening 112 of the shaping device 108 as previously described with reference to FIG. 3, namely such opening having an inwardly tapering circumferential surface 134. A plurality of circumferentially arranged longitudinally extending openings 136 are provided within the surface portion of the cylindrical body 128 forming the bore 130. As illustrated, such openings 136 are of rectangular shape, however, such openings may be of triangular shape, trapezoidal shape or the like. Slidably engaged within the bore 130 of the cylindrical body 128 is a shaping member 138 constructed from a cylindrical portion provided with a plurality of circumferentially arranged longitudinally extending teeth 140 of either triangular shape, trapezoidal shape or rectangular shape and adapted to be received within the openings 136 within the cylindrical body 128. The shaping member 138 is provided at one end with a cone shaped member 142 having an apex 144 and exterior surface 146 of generally similar construction to the cone shaping member 116 as described in FIGS. 2 and 3.

The adjustable shaping device 126 is assembled in the manner shown in FIG. 5 with the shaping member 138 slidably fit within the bore 130 of the cylindrical body 128 such that the teeth 140 engage within the openings 136. In such assembled construction, the cone shaped member 142 is centrally positioned within the opening 132 of the cylindrical body 128 and extends outwardly therefrom.

The operation of the adjustable shaping device 126 in accordance with the present invention is generally the same as that previously described with respect to the shaping device 108 as illustrated in FIGS. 2 and 3. Specifically, the shaping member 138 is slid within the bore 130 of the cylindrical body 128 until the base of the cone shaped member 142, as shown by the dotted lines 148, is bound by the inwardly tapering surface 134 of the opening 132. In this regard, the diameter of the base 142 can be adjusted to be substantially the same as that of the tube 100 whose open end 104 is to be shaped. The shaping member 138 may be maintained at its position within the bore 130 by use of a set screw 150. To accomodate a tube 100 having a greater diameter, the shaping member 138 is slid downwardly within the bore 130 so as to expose a greater extent of the cone shaped member 142 whereby the diameter of the base of the cone shaped member is effectively increased as illustrated by the base represented by the dotted lines 152. In all other respects, the use of the adjustable shaping device 126 as described and illustrated in FIGS. 4 and 5 is precisely the same as that of the shaping device 108 illustrated in FIGS. 2 and 3.

In accordance with the present invention, there has been described a tube shaping device comprising a body having an opening in one end thereof and a conical shaping member arranged within the opening extending outwardly therefrom. The conical shaping member is constructed to include a base arranged such that the circumferential edge of the base is bound by a portion of the body forming the opening, whereby the conical shaping member is adapted to be increasingly received within the open end of a flexible tube until the tube end lies substantially within the plane containing the base of the conical shaping member such that the shape of the open end of the tube is conformed to the circumferential shape of the base.

Although the invention herein has been described with reference to particular embodiments, it is to be understood that these embodiments are merely illustrative of the principles and application of the present invention. It is to be understood that numerous modifications may be made in the illustrative embodiments and that other arrangements may be devised without departing from the spirit and scope of the present invention as defined by the appended claims.

What is claimed is:

1. A tube shaping device comprising a body having an opening at one end and a bore extending through said body in communication with said opening and a shaping member arranged within said opening extending outwardly and having a base arranged such that the circumferential edge of said base is bound by a portion of said body forming said opening, said shaping member adapted for sliding fit within said bore between a plurality of positions such that the effective diameter of said base varies whereby said shaping member is adapted to be received within a tube end until said tube end lies substantially within a plane containing said base of said shaping member such that the shape of said tube end is conformed to the circumferential shape of said base.

2. The tube shaping device as set forth in claim 1 wherein said opening is formed by inwardly tapering surfaces.

3. The tube shaping device as set forth in claim 1 wherein said shaping member is conical in shape and having its apex lying substantially in the plane containing the open end of said body.

4. The tube shaping device as set forth in claim 1 wherein said base of said shaping member lies substantially in the plane containing the open end of said body.

5. The tube shaping device as set forth in claim 1 wherein the circumferential shape of said base is substantially circular.

6. The tube shaping device as set forth in claim 1 wherein said shaping member includes a cylindrical portion having a plurality of longitudinally extending circumferentially positioned teeth adapted to be received within corresponding longitudinally extending openings provided within the surface portion of said body forming said bore.

7. The tube shaping device as set forth in claim 6 wherein said teeth are constructed of triangular, trapezoidal or rectangular shape.

* * * * *